United States Patent
Tsuda et al.

(10) Patent No.: US 7,519,687 B2
(45) Date of Patent: Apr. 14, 2009

(54) COMMUNICATIONS MODULE EXECUTION CONTROL SYSTEM, COMMUNICATIONS MODULE EXECUTION CONTROL METHOD, APPLICATION EXECUTION CONTROL SYSTEM, AND APPLICATION EXECUTION CONTROL METHOD

(75) Inventors: Masayuki Tsuda, Tokyo (JP); Takefumi Naganuma, Kyoto (JP); Hideyuki Nagasawa, Yokohama (JP); Eriko Oseki, Yokohama (JP); Fukiko Maeda, Yokohama (JP); Nobuyuki Watanabe, Yokohama (JP); Mao Asai, Yokosuka (JP); Takashi Kondo, Tokyo (JP); Kazuhiro Yamada, Yokohama (JP); Dai Kamiya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 360 days.

(21) Appl. No.: 10/496,790

(22) PCT Filed: Dec. 5, 2002

(86) PCT No.: PCT/JP02/12775

§ 371 (c)(1),
(2), (4) Date: Jun. 4, 2004

(87) PCT Pub. No.: WO03/049415

PCT Pub. Date: Dec. 6, 2003

(65) Prior Publication Data

US 2005/0075101 A1    Apr. 7, 2005

(30) Foreign Application Priority Data

Dec. 7, 2001   (JP)   ............................. 2001-374626

(51) Int. Cl.
*G06F 13/00* (2006.01)

(52) U.S. Cl. .................. 709/219; 709/225; 709/227
(58) Field of Classification Search ................. 709/217, 709/219, 224, 225, 227, 228, 223
See application file for complete search history.

(56) References Cited

U.S. PATENT DOCUMENTS 6,000,035 A * 12/1999 Matsushima et al. ........ 713/320

(Continued)

FOREIGN PATENT DOCUMENTS

CN    1176009    3/1998

(Continued)

OTHER PUBLICATIONS

Takasaku Nakanishi, "Know the Basic i-appli's", Java World, vol. 5, No. 4, IDG Japan Co., Ltd., Apr. 1, 2001, 11 pages, (with partial English translation).

(Continued)

*Primary Examiner*—Viet Vu
(74) *Attorney, Agent, or Firm*—Oblon, Spivak, McClelland, Maier & Neustadt, P.C.

(57) ABSTRACT

A mobile telephone 2 having a function for downloading and executing an application A from a network server comprises a communications module execution control system 1. The judging section 132 acquires and refers to an attribute information file 14. If the attribute information file 14 contains a (UseTelephone=call) definition, then the judging section 132 judges that the call section 102 is to be executed by the application A, and if there is no UseTelephone key, then it judges that the call section 102 is not be executed by the application A. If the UseTelephone value is not "call", then the judging section 132 judges that the download of the application A is not allowed. The control section 136 controls the download and execution of the application A, in accordance with the judgement from the judging section 132.

8 Claims, 14 Drawing Sheets

U.S. PATENT DOCUMENTS

| | | | |
|---|---|---|---|
| 6,134,313 A * | 10/2000 | Dorfman et al. | 379/201.01 |
| 6,146,275 A | 11/2000 | Asai et al. | |
| 6,289,462 B1 * | 9/2001 | McNabb et al. | 726/21 |
| 6,307,471 B1 * | 10/2001 | Xydis | 340/568.1 |
| 6,321,267 B1 * | 11/2001 | Donaldson | 709/229 |
| 6,370,394 B1 * | 4/2002 | Anttila | 455/417 |
| 6,745,367 B1 * | 6/2004 | Bates et al. | 715/500 |
| 6,757,550 B1 * | 6/2004 | Yoneyama et al. | 455/525 |
| 6,934,753 B2 * | 8/2005 | Kim | 709/225 |
| 7,035,932 B1 * | 4/2006 | Dowling | 709/230 |
| 7,058,822 B2 * | 6/2006 | Edery et al. | 726/22 |
| 2001/0023432 A1 * | 9/2001 | Council et al. | 709/206 |
| 2001/0044818 A1 * | 11/2001 | Liang | 709/201 |
| 2002/0095530 A1 * | 7/2002 | Wong | 710/1 |

FOREIGN PATENT DOCUMENTS

| | | |
|---|---|---|
| CN | 1287432 | 3/2001 |
| JP | 2000-22841 | 1/2000 |
| JP | 2001-78265 | 3/2001 |
| JP | 2001-159527 | 6/2001 |
| JP | 2001-309074 | 11/2001 |

OTHER PUBLICATIONS

"Operation Manual of Digital Mova F503i Hyper", NTT DoCoMo, Ver. 2., Feb. 2001, 6 pages (with partial English translation).

"DoCoMo by Sony SO503i Operation Manual", NTT DoCoMo, Ver. 1, Jan. 2001, 3 pages, (with partial English translation).

Rikiya Okabe, Nikkei Business Publication, Inc., "My First i-mode, Java programing from preparation to distribution, all about development of "i-appli"", Connect Corporation, 1st edition, Introduction to Java programming in i-mode, 1st edition, Mar. 26, 2001, with partial translation of pp. 221-225.

* cited by examiner

*Fig.2*

| KEY | VALUE |
|---|---|
| AppName | ××××× |
| AppSize | ××× |
| PackageURL | ××××× |
| AppClass | ×××× |
| LastModified | Sun, ××Nov 2001 ××:××:×× |
| ⋮ | ⋮ |
| UseTelephone | call |
| UseBrowser | launch |
| UseMailer | launch |
| ⋮ | ⋮ |

| KEY | VALUE |
|---|---|
| AppName | ××××× |
| AppSize | ××× |
| PackageURL | ××××× |
| AppClass | ×××× |
| LastModified | Sun, ××Nov 2001 ××:××:×× |
| ⋮ | ⋮ |
| LaunchByBrowser | http://www.××××× |
| ⋮ | ⋮ |

44

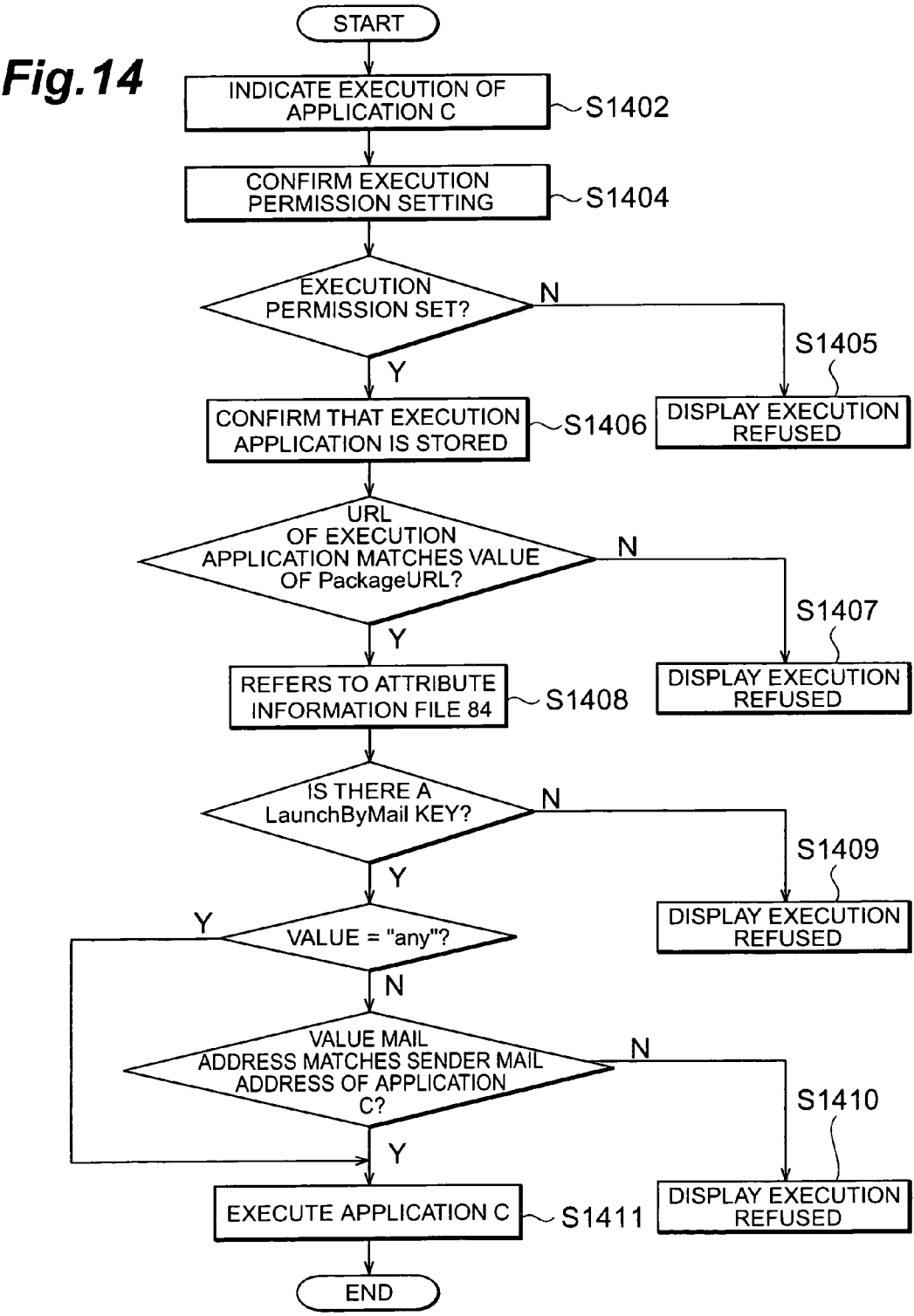

COMMUNICATIONS MODULE EXECUTION CONTROL SYSTEM, COMMUNICATIONS MODULE EXECUTION CONTROL METHOD, APPLICATION EXECUTION CONTROL SYSTEM, AND APPLICATION EXECUTION CONTROL METHOD

TECHNICAL FIELD

The present invention relates to a communications module execution control system and communications module execution control method, and an application execution control system and application execution control method.

BACKGROUND ART

Conventionally, in communications terminals in which applications operate, an application activates a communications module (communications function, browser, mailer, or the like) of the communications terminal, and HTML files displayed by a browser or an electronic mail, or the like, received via a mailer, execute an application.

DISCLOSURE OF THE INVENTION

However, in a communications terminal in which an application operates, the user cannot readily tell whether or not a communications module is to be executed by an application, and moreover, it is difficult for the application manager of the communications terminal to identify the conditions for executing an application in the communications terminal. Consequently, there has been a problem in that the execution of applications in a communications terminal has been difficult to control. For example, a communications module may be executed by an application without the knowledge of the user, or an application provider may have difficulty setting up conditions in order that an application is executed by the application manager.

Therefore, it is an object of the present invention to provide an application execution control system, and the like, which facilitates control of the execution of applications in a communications terminal.

In order to achieve the aforementioned object, the communications module execution control system according to the present invention is a communications module execution control system for controlling the execution of a communications module of a communications terminal by means of an application, characterized in that it comprises: judging means for referring to an application attribute information file wherein attribute information for the application, including information relating to whether or not the application is to execute the communications module, is defined, and judging whether or not the application is to execute the communications module; indicator means for indicating the judgement result from the judging means; and control means for controlling the execution of the communications module by means of the application, in accordance with the judgement result from the judging means.

Since the control means controls the execution of the communications module by the application in accordance with the judgement result from the judging means regarding whether or not the application is to execute a communications module, after the judging means has referred to an attribute information file which defines information relating to whether or not the application is to execute a communications module, the execution of the application in the communications terminal can be controlled easily. Moreover, since the indicator means indicates the judgement result from the judging means with respect to whether or not the application is to execute a communications module, then the user can readily tell whether or not the application is to execute a communications module.

Desirably, the communications module execution control system according to the present invention further comprises: communications destination confirming means for indicating the communications destination of the communications module which is to be executed by the application, and receiving confirmation thereof.

Since the communications destination confirming means indicates a communications destination and receives confirmation thereof, it is possible to prevent a communication being made to a destination not desired by the user.

Desirably, the communications module execution control system according to the present invention further comprises: measuring means for measuring the radio field state when the communications module is being executed by the application; and halting means for halting the execution of the communications module by the application, when the radio field state measured by the measuring means is at or below a prescribed level.

The execution of the application is terminated whilst communications are being conducted by the communications module. Since the halting means halts the execution of the communications module when the radio field state measured by the measuring means is at or below a prescribed level, it is possible to prevent the execution of the application from remaining in an idle state if the radio field state is poor and communications require a long time.

In order to achieve the aforementioned objects, the communications module execution control method of the present invention is a communications module execution control method for controlling the execution of a communications module of a communications terminal by means of an application, characterized in that it comprises: a judging step wherein judging means refers to an application attribute information file wherein attribute information for the application, including information relating to whether or not the application is to execute the communications module, is defined, and judges whether or not the application is to execute the communications module; an indicating step wherein indicator means indicates the judgement result from the judging means; and a control step for controlling the execution of the communications module by means of the application, in accordance with the judgement result from the judging means.

Since the control means controls the execution of the communications module by the application, in the control step, in accordance with the judgement result from the judging means regarding whether or not the application is to execute a communications module, after the judging means has referred to an attribute information file which defines information relating to whether or not the application is to execute a communications module, in the judgement step, then the execution of the application in the communications terminal can be controlled easily. Moreover, since the indicator means indicates, in the indicating step, the judgement result from the judging means with respect to whether or not the application is to execute a communications module, then the user can readily tell whether or not the application is to execute a communications module.

Desirably, the communications module execution control method according to the present invention further comprises a communications destination confirming step wherein communications destination confirming means indicates the communications destination of the communications module which is to be executed by the application, and receives confirmation thereof.

Since the communications destination confirming means indicates a communications destination and receives confirmation thereof, in a communications destination confirming step, it is possible to prevent a communication being made to a destination not desired by the user.

Desirably, the communications module execution control method according to the present invention further comprises: a measuring step wherein measuring means measures the radio field state when the communications module is being executed by the application; and a halting step wherein halting means halts the execution of the communications module by the application, when the radio field state measured by the measuring means is at or below a prescribed level.

The execution of the application is terminated whilst communications are being conducted by the communications module. Since the halting means halts the execution of the communications module, in the halting step, when the radio field state measured by the measuring means is at or below a prescribed level, it is possible to prevent the execution of the application from remaining in an idle state if the radio field state is poor and communications require a long time.

In order to achieve the aforementioned objects, the application execution control system according to the present invention is an application execution control system for controlling the execution of an application in a communications terminal having a browser, characterized in that it comprises: comparing means for referring to an attribute information file in which attribute information for the application, including information relating to a URL, is defined, and comparing the URL of the file on the network being displayed by the browser with the aforementioned URL defined by the attribute information file; and control means for controlling the execution of the application in accordance with the comparison result from the comparing means.

Since the control means controls the execution of the application in accordance with the comparison results from the comparing means, after the comparing means has referred to the attribute information file defining information relating to a URL and has compared the URL of the file on the network being displayed by the browser with the aforementioned URL defined by the attribute information file, then the execution of an application in the communications terminal can be controlled easily. Moreover, an application provider is able to set conditions relating to URLs of network files which are able to execute applications in a communications terminal, readily, by using an attribute information file.

In order to achieve the aforementioned objects, the application execution control method according to the present invention is an application execution control method for controlling the execution of an application in a communications terminal having a browser, characterized in that it comprises: a comparing step wherein comparing means refers to an attribute information file in which attribute information for the application, including information relating to a URL, is defined, and compares the URL of the file on the network being displayed by the browser with the aforementioned URL defined by the attribute information file; and a control step wherein control means controls the execution of the application in accordance with the comparison result from the comparing means.

Since the control means controls the execution of the application, in the control step, in accordance with the comparison results from the comparing means, after the comparing means has referred to the attribute information file defining information relating to a URL and has compared the URL of the file on the network being displayed by the browser with the aforementioned URL defined by the attribute information file, in the comparing step, then the execution of an application in the communications terminal can be controlled easily. Moreover, an application provider is able to set conditions relating to URLs of network files which are able to execute applications in a communications terminal, readily, by using an attribute information file.

In order to achieve the aforementioned objects, the application execution control system according to the present invention is an application execution control system for controlling the execution of an application in a communications terminal having a mailer, characterized in that it comprises: comparing means for referring to an attribute information file in which attribute information for the application, including information relating to a mail address, is defined, and comparing the sender mail address of an electronic mail received by the mailer with the information relating to a mail address defined by the attribute information file; and control means for controlling the execution of the application in accordance with the comparison result from the comparing means.

Since the control means controls the execution of the application in accordance with the comparison results from the comparing means, after the comparing means has referred to the attribute information file defining information relating to a mail address and has compared the sender mail address of the electronic mail received by the mailer with the information relating to a mail address defined in the attribute information file, then the execution of an application in the communications terminal can be controlled easily. Moreover, an application provider is able to set conditions relating to sender mail addresses of electronic mails which are able to execute applications in a communications terminal, readily, by using an attribute information file.

In order to achieve the aforementioned objects, The application execution control method according to the present invention is an application execution control method for controlling the execution of an application in a communications terminal having a mailer, characterized in that it comprises: a comparing step wherein comparing means refers to an attribute information file in which attribute information for the application, including information relating to a mail address, is defined, and compares the sender mail address of an electronic mail received by the mailer with the information relating to a mail address defined by the attribute information file; and a control step wherein control means controls the execution of the application in accordance with the comparison result from the comparing means.

Since the control means controls the execution of the application, in the control step, in accordance with the comparison results from the comparing means, after the comparing means has referred to the attribute information file defining information relating to a mail address and has compared the sender mail address of the electronic mail received by the mailer with the information relating to a mail address defined in the attribute information file, in the comparing step, then the execution of an application in the communications terminal can be controlled easily. Moreover, an application provider is able to set conditions relating to sender mail addresses of electronic mails which are able to execute applications in a communications terminal, readily, by using an attribute information file.

BRIEF DESCRIPTION OF THE DRAWINGS

FIG. 2 is a diagram showing the contents of an attribute information file 14;

FIG. 8 is a diagram showing the contents of an attribute information file 44;

FIG. 14 is a flowchart showing the procedure of an operation wherein an application execution control system 8 controls the execution of an application C.

BEST MODES FOR CARRYING OUT THE INVENTION

Below, preferred embodiments of the communications module execution control system and communications module execution control method, and the application execution control system and application execution control method are described in detail with reference to the accompanying drawings.

First Embodiment

Figure 1:
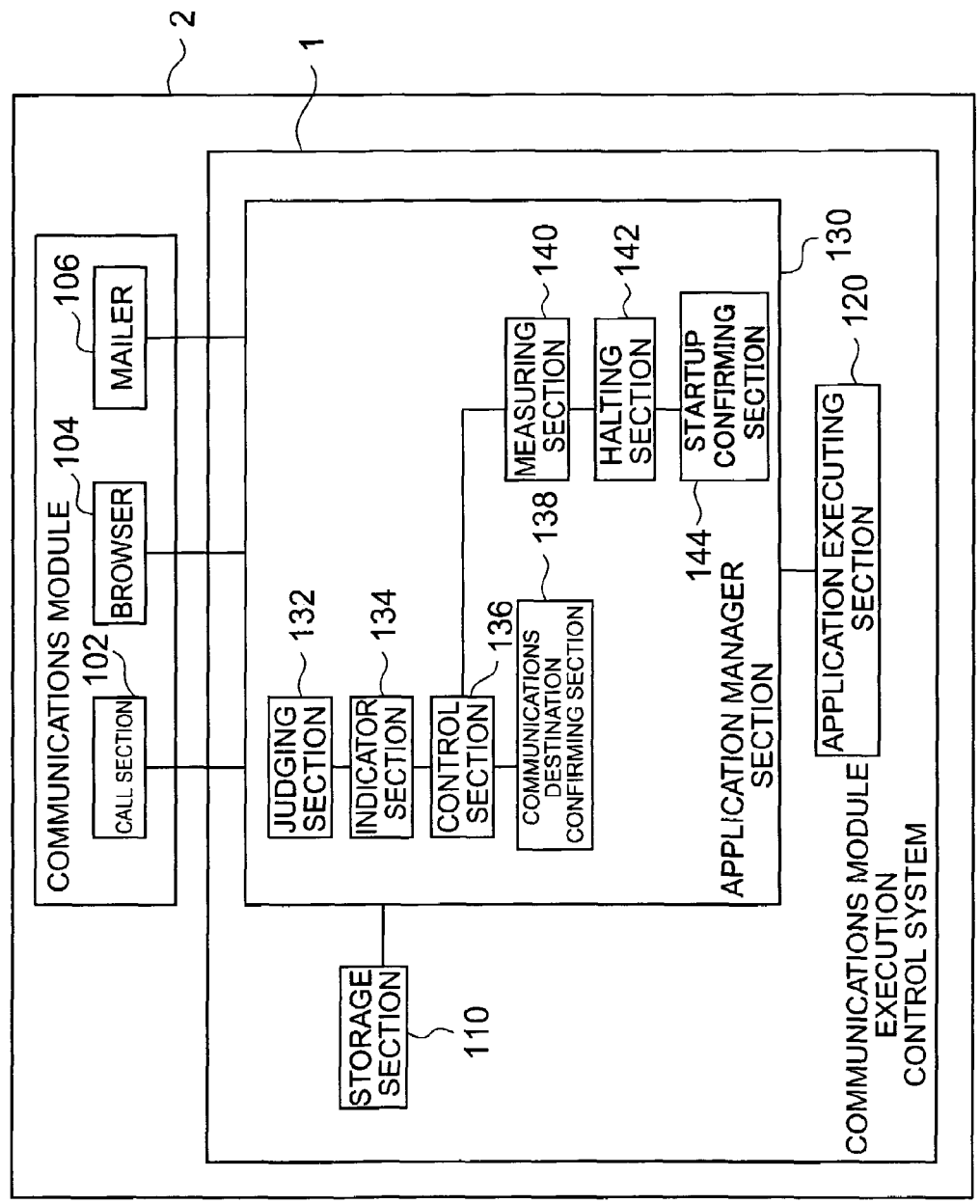
FIG. 1 is a diagram showing the functional composition of a communications module execution control system 1.

Firstly, the functional composition of the communications module execution control system 1 according to the first embodiment is described. FIG. 1 shows the functional composition of the communications module execution control system 1. As shown in FIG. 1, a mobile telephone 2 having a function for downloading and executing an application stored in a server on the network (hereinafter, called "application A" in the first embodiment) comprises a communication module execution control system 1. Further, the mobile telephone 2 comprises, as a communications module, a call section 102, browser 104 and mailer 106 (mail communications function). A communications module execution control system 1 comprises a storage section 110 for storing downloaded applications A, an application executing section 120 for executing an application A stored in the storage section 110, and an application manager section 130 for managing download of applications A and execution of applications A by the application executing section 120.

Prior to downloading the application A, a judging section 132 of the application manager section 130, described hereinafter, acquires an attribute information file 14 which describes the attribute information of the application A. FIG. 2 shows the contents of an attribute information file 14. As shown in FIG. 2, the attribute information file 14 describes a plurality of groups comprising keys and their corresponding values, such as (AppName Name of application A), (AppSize=Size of file storing application A), (PackageURL=URL of file storing application A), (AppClass=main class used to start up application A), (LastModified=date of last modification), and the like. When the call section 102 is executed by the application A, it is necessary to specify (UseTelephone=call) in the attribute information file 14, in addition to the aforementioned (key=value) groups. Similarly, if the browser 106 is to be executed, then (UseBrowser=launch) must be specified in the attribute information file 14, and if the mailer 104 is to be executed, then (UseMailer=launch) must be specified therein.

The application manager section 130 comprises: a judging section 132 (judging means), a indicator section 134 (display means), a control section 136 (control means), a communications destination verifying section 138 (communications destination verifying means), a measuring section 140 (measuring means), a halting section 142 (halting means), and a startup confirming section 144.

The judging section 132 refers to the attribute information file 14 and determines whether or not the application A is to execute the call section 102, browser 104, or mailer 106. More specifically, if the attribute information file 14 contains the definition (UseTelephone=call), then the judging section 132 judges that the call section 102 is to be executed by the application A, whereas if it does not contain the UseTelephone key, then the judging section 132 judges that the call section 102 is not to be executed by the application A. If the UseTelephone key is not "call", then the judging section 132 determines that download of the application A is not possible. Similarly, if the attribute information file 14 contains the definition (UseBrowser=launch), the judging section 132 determines that the browser 104 is to be executed by the application A, whereas if there is no UseBrowser key, then the judging section 132 determines that the browser 104 is not to be executed by the application A. If the value of UseBrowser is not "launch", then the judging section 132 determines that download of the application A is not possible. If the attribute information file 14 contains the definition "(UseMailer =launch)", the judging section 132 determines that the mailer 106 is to be executed by the application A, whereas if there is no UseMailer key, then it determines that the mailer 106 is not to be used by the application A. If the value of UseMailer is not "launch", then the judging section 132 determines that download of the application A is not possible.

The indicator section 134 displays the results of the judgements made by the judging section 132 above (whether or not the application A is to execute the call section 102, browser 104 or mailer 106), on the display of the mobile telephone 2.

In accordance with the results of the judgements made by the aforementioned judging section 132, the control section 136 controls the download of the application A and the execution of the application A by the application executing section 120.

When the call section 102 is to be executed by the application A, the communications destination verifying section 138 displays the telephone number of the party being called, on the display of the mobile telephone 2, and asks whether or not to make the call.

The measuring section 140 measures the radio field state whilst the browser 104 is being executed by the application A.

The halting section 142 halts the execution of the browser 104 by the application A if the radio field state measured by the measuring section 140 is at or below a prescribed level. On the other hand, if the radio field state measured by the measuring section 140 exceeds the prescribed level, then the startup confirming section 144 displays a browser startup confirmation screen on the display of the mobile telephone 2, asking whether or not to start up the browser.

Next, the operation of controlling the download of the application A and the execution of the communications module by the application A (call section 102, browser 104 and mailer 106), by means of the communications module execution control system 1, is described.

Figure 3:
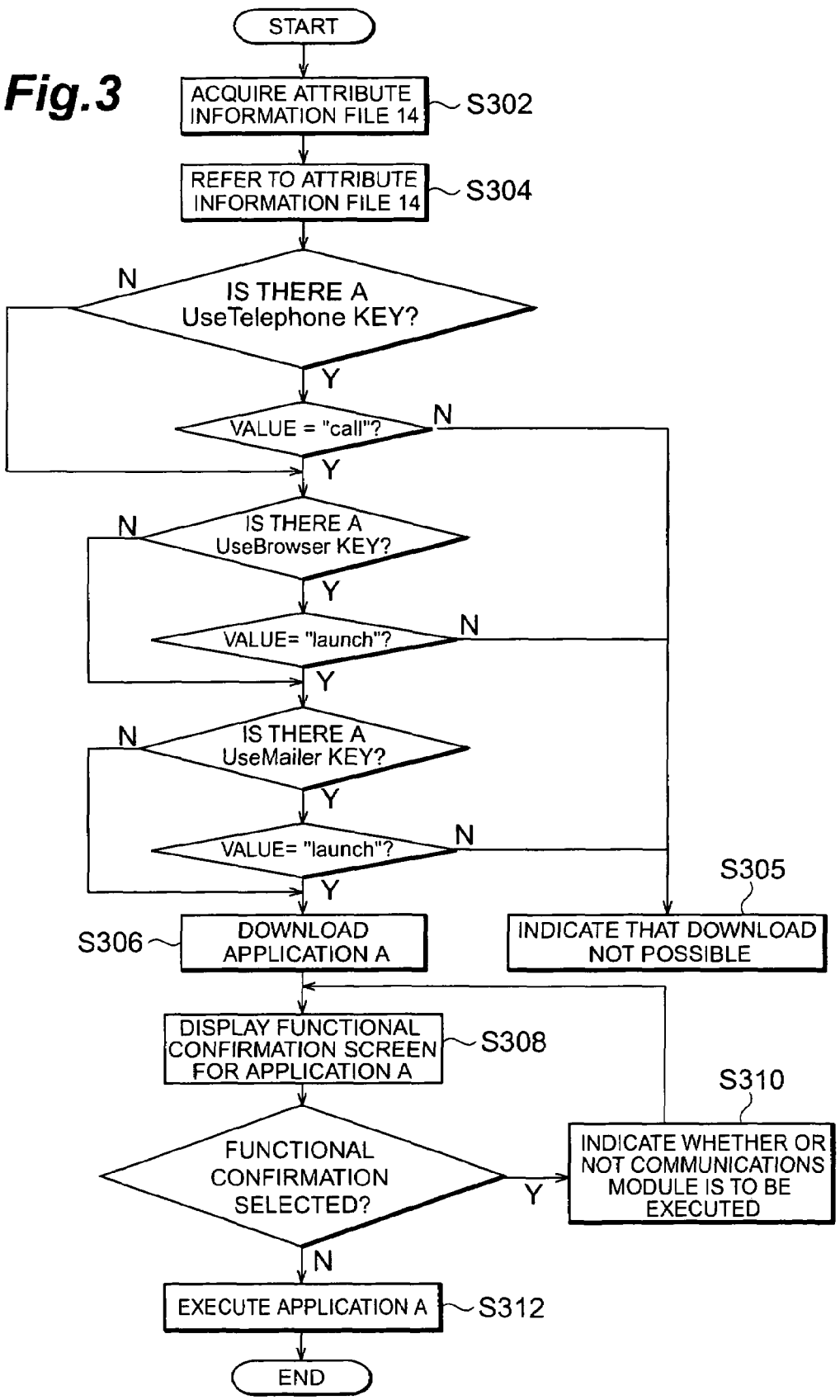
FIG. 3 is a flowchart showing the procedure of an operation wherein a communications module execution control system 1 controls download and execution of an application A.

FIG. 3 is a flowchart showing the procedure of an operation whereby the communications module execution control system 1 controlling the download and execution of application A.

The judging section 132 acquires an attribute information file 14 from a server on the network where the application A is stored (S302).

The judging section 132 refers to the attribute information file 14 and searches for a definition of the UseTelephone key (S304).

If a UseTelephone key is defined, but the value thereof is not "call", then the judging section 132 judges that download of the application A is not possible, and the indicator section 134 indicates on the display of the mobile telephone 2 that download of the application A is not possible (S305). If the UseTelephone key is defined and the value thereof is "call", then the judging section 132 judges that the application A is to execute the call section 102. If the UseTelephone key is not defined, then the judging section 132 judges that the application A is not to execute the call section 102.

Similar processing is implemented with respect to execution of the browser 104 and the mailer 106 by the application A, and if the UseBrowser key is defined but the value thereof is not "launch", or if the UseMailer key is defined but the value thereof is not "launch", then the indicator section 134 indicates on the display of the mobile telephone 2 that download of the application A is not possible (S305). If there is no UseBrowser key or there is the combination (UseBrowser =launch), or if there is no UseMailer key or there is the combination (UseMailer=launch), then the control section 136 downloads the application A (S306).

When the application A is downloaded, the indicator section 134 displays a function confirmation screen for the application A (screen asking for confirmation of the communications module of the mobile telephone to be executed by the application A), on the display of the mobile telephone 2 (S308), asking the user to confirm the function. If the user selects the confirm function option, and if the judging section 132 has determined that the application A is to execute one of the communications modules, then the indicator section 134 displays an indication to this effect on the display of the mobile telephone 2 (S310). When a display has been provided indicating whether or not the application A is to execute a communications module, the indicator section 134 returns to processing for displaying the function confirmation screen for the application, on the display of the mobile telephone 2.

If the user specifies that functional confirmation is not necessary, then the application executing section 120 executes the application A (S312).

Figure 4:
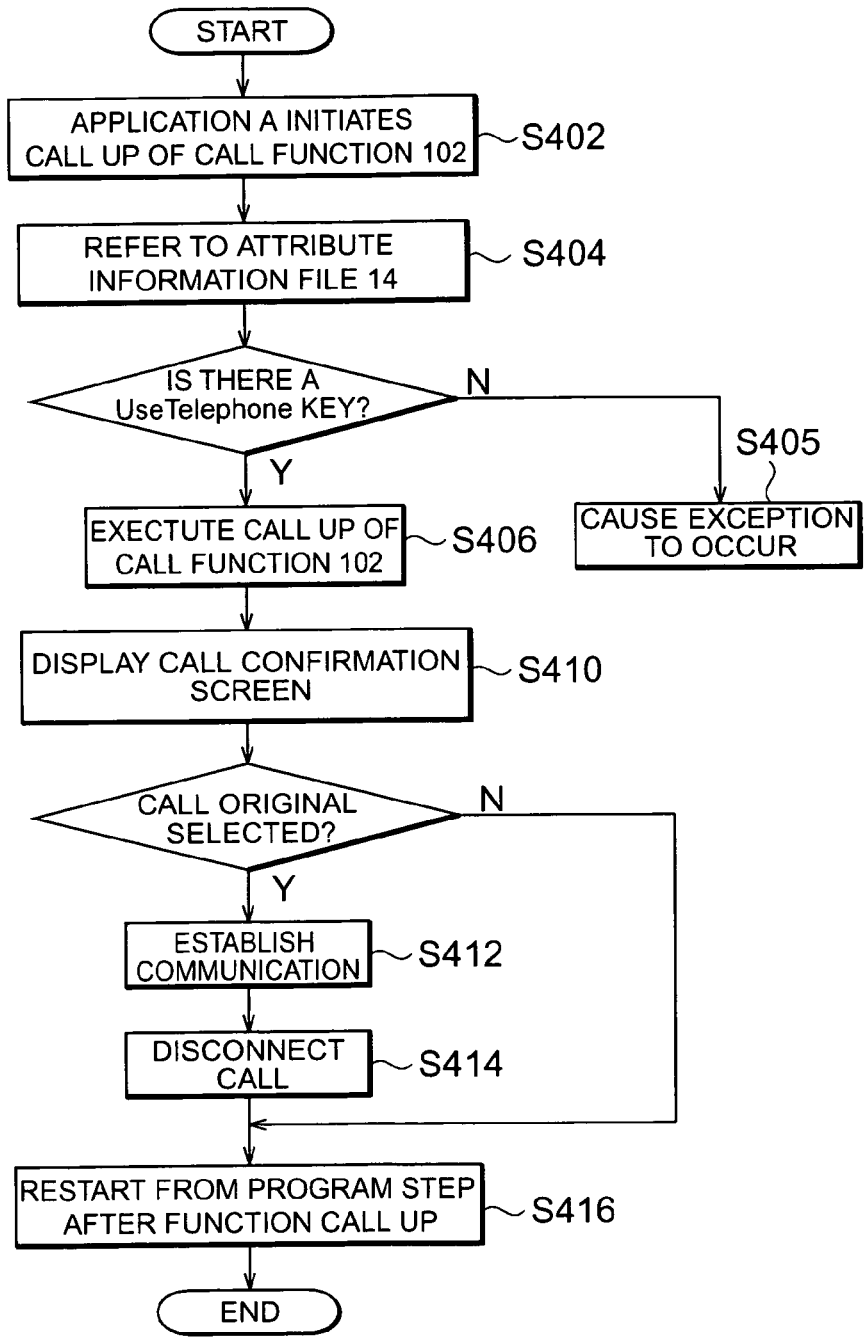
FIG. 4 is a flowchart showing the procedure of an operation wherein the communications module execution control system 1 controls the execution of a call section 102, when an application A has initiated a call up of the call section 102.

FIG. 4 is a flowchart showing the procedure of an operation whereby the communications module execution control system 1 controls execution of the call section 102 when the application A has initiated a call up of the call section 102. When the application A initiates a call up of the call section 102 (S402), the judging section 132 refers to the attribute information file 14 and examines whether the UseTelephone key is defined in the attribute information file 14 (S404).

If the UseTelephone key has not been defined in the attribute information file 14, then the judging section 132 determines that execution of the call section 102 by the application A is not possible, and the control section 136 causes an exception to occur (S405). If the UseTelephone key is defined in the attribute information file 14, then the application A executes a call up of the call section 102 (S406).

If the call section 102 is called up by the application A, then the communications destination communications destination verifying section 138 displays the telephone number to which a call is to be made, and an outgoing call confirmation screen, on the display of the mobile telephone 2, asking the user whether to make the call (S410). If the user selects not to make the call, then the control section 136 restarts execution of the application A from the next program step after the call up of the call section 102 (S416). If the user selects to make the call, then the call section 102 establishes a telephone communication (S412). If the telephone communication is disconnected (S414), then the control section 136 restarts execution of the application A from the next program step after the call up of the call section 102 (S416).

Figure 5:
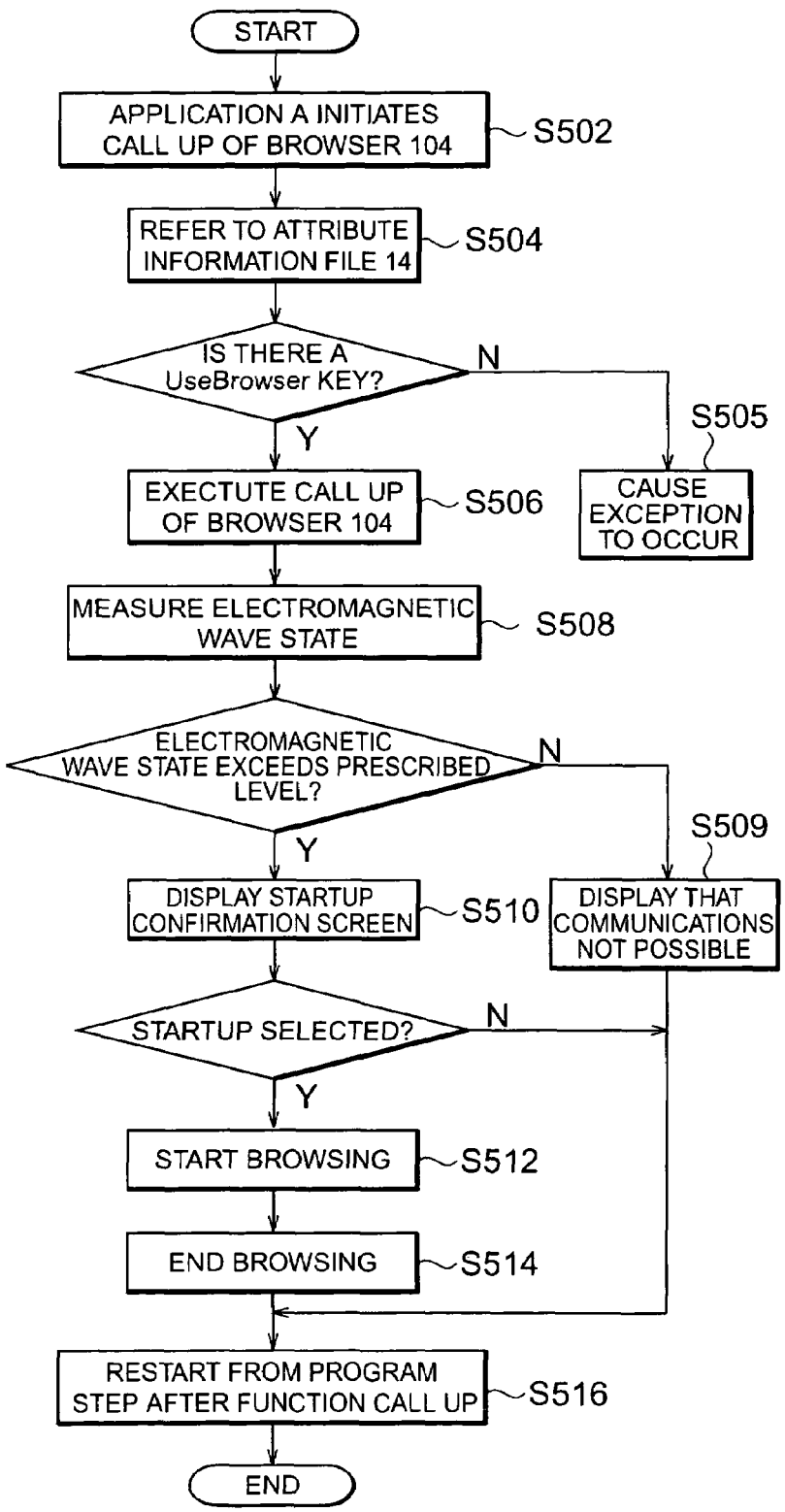
FIG. 5 is a flowchart showing the procedure of an operation wherein the communications module execution control system 1 controls the execution of a browser 104, when an application A has initiated a call up of the browser 104.

FIG. 5 is a flowchart showing the procedure of an operation wherein the communications module execution control system 1 controls the execution of the browser 104, when the application A has initiated a call up of the browser 104. When the application A initiates a call up of browser 104 (S502), the judging section 132 refers to the attribute information file 14 and examines whether the UseBrowser key has been defined in the attribute information file 14 (S504).

If there is no UseBrowser key definition in the attribute information file 14, then the judging section 132 determines that execution of the browser 104 by the application A is not possible, and the control section 136 causes an exception to occur (S505). If the UseBrowser key is defined in the attribute information file 14, then the application A implements a call up of the browser 104 (S506).

When the browser 104 is called up by the application A, the measuring section 140 measures the radio field state (S508). If the radio field state measured by the measuring section 140 is equal to or less than a prescribed level, then the halting means 142 halts the execution of the browser 104, a display indicating that communications are not possible is shown on the display of the mobile telephone 2 (S309), and the control section 136 restarts the execution of the application A from the next program step after call up of the browser (S516).

If the radio field state measured by the measuring section 140 exceeds a prescribed level, the startup confirming section 144 displays a browser startup confirmation screen on the display of the mobile telephone 2 (S510).

If the user selects not to start up the browser 104, then the control section 136 restarts execution of application A from the next program step after the call up of the browser (S516). If the user selects to start up the browser 104, then the browser 104 starts browsing (S512). When browsing is terminated (S514), the control section 136 restarts the execution of application A from the next program step after the call up of the browser (S516).

Figure 6:
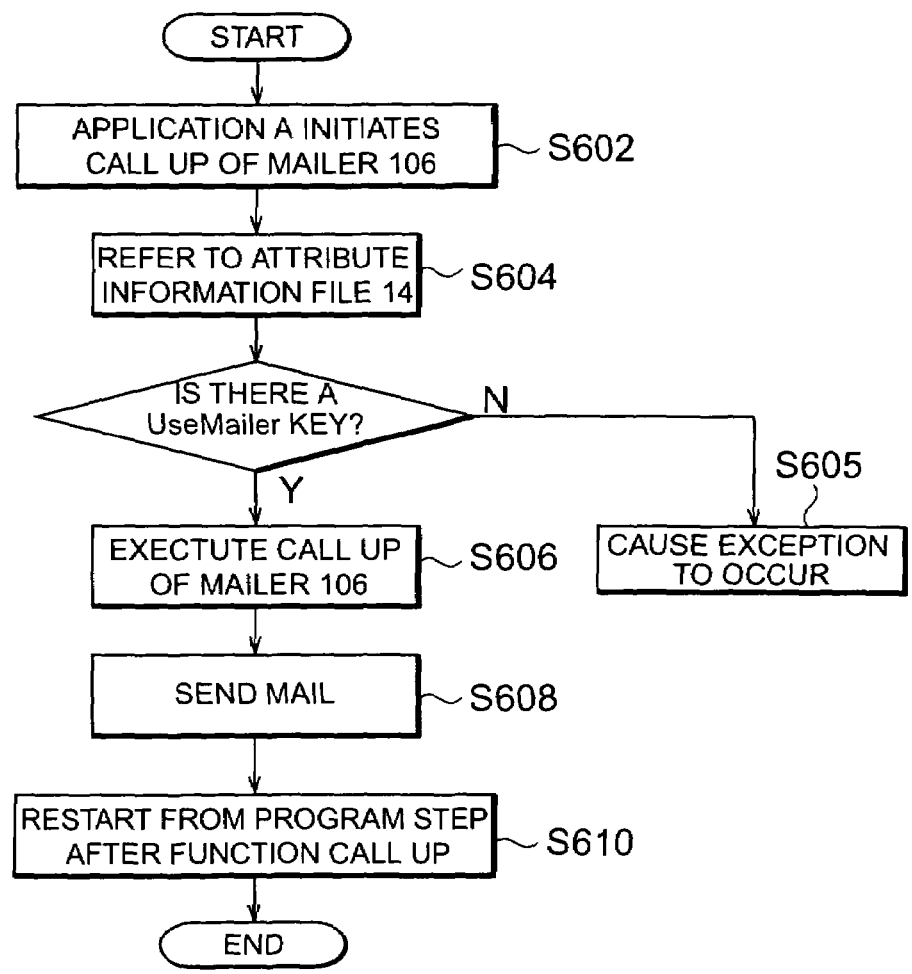
FIG. 6 is a flowchart showing the procedure of an operation wherein the communications module execution control system 1 controls the execution of a mailer 106, when an application A has initiated a call up of the mailer 106.

FIG. 6 is a flowchart showing the procedure of an operation wherein the communications module execution control system 1 controls the execution of the mailer 106, when the application A has initiated a call up of the mailer 106. When the application A initiates a call up of the mailer 106 (S602), the judging section 132 refers to the attribute information file 14 and examines whether the UseMailer key is defined in the attribute information file 14 (S604).

If there is no UseMailer key definition in the attribute information file 14, then the judging section 132 determines that execution of the mailer 106 by the application A is not possible, and the control section 136 causes an exception to occur (S605). If the UseMailer key is defined in the attribute information file 14, then the application A executes a call up of the mailer 106 (S606).

When the mailer 106 is called up, the mailer 106 sends electronic mail (S608) When mail transmission has completed, the control section 136 restarts execution of the application A from the next program step after the call up of the mailer (S610).

In the action of the communications module execution control system 1 performing the operations described above, since the control section 136 controls the execution of the communications modules by the application A in accordance with the judgement result returned by the judging section 132 with respect to whether or not the application A is to execute a communications module (call section 102, browser 104, mailer 106), after the judging section 132 has referred to the attribute information file 14, the execution of the application in the mobile telephone 2 can be controlled easily. Moreover, since the display section 134 indicates the judgement result returned by the judging section 132 with respect to whether or not the application A is to execute a communications module, the user can readily tell whether or not the application A is to execute a communications module.

Since the communications destination verifying section 138 displays the telephone number being called and receives confirmation, it is possible to prevent calls being made to a communications destination that is not desired by the user.

Since the halting section 142 halts the execution of the browser when the radio field state measured by the measuring section 140 is at or below a prescribed level, then it is possible to prevent the execution of the application A from remaining in an idle state if the radio field state is poor and communications require a long time.

The control performed according to the aforementioned procedure using the communications module execution control system 1 also represents an embodiment of the communications module execution control method according to the present invention. According to the communications module execution control method relating to this embodiment, a similar action and beneficial effects can be obtained as those of the control of the application execution by the communications module execution control system 1 described above.

Second Embodiment

Figure 7:
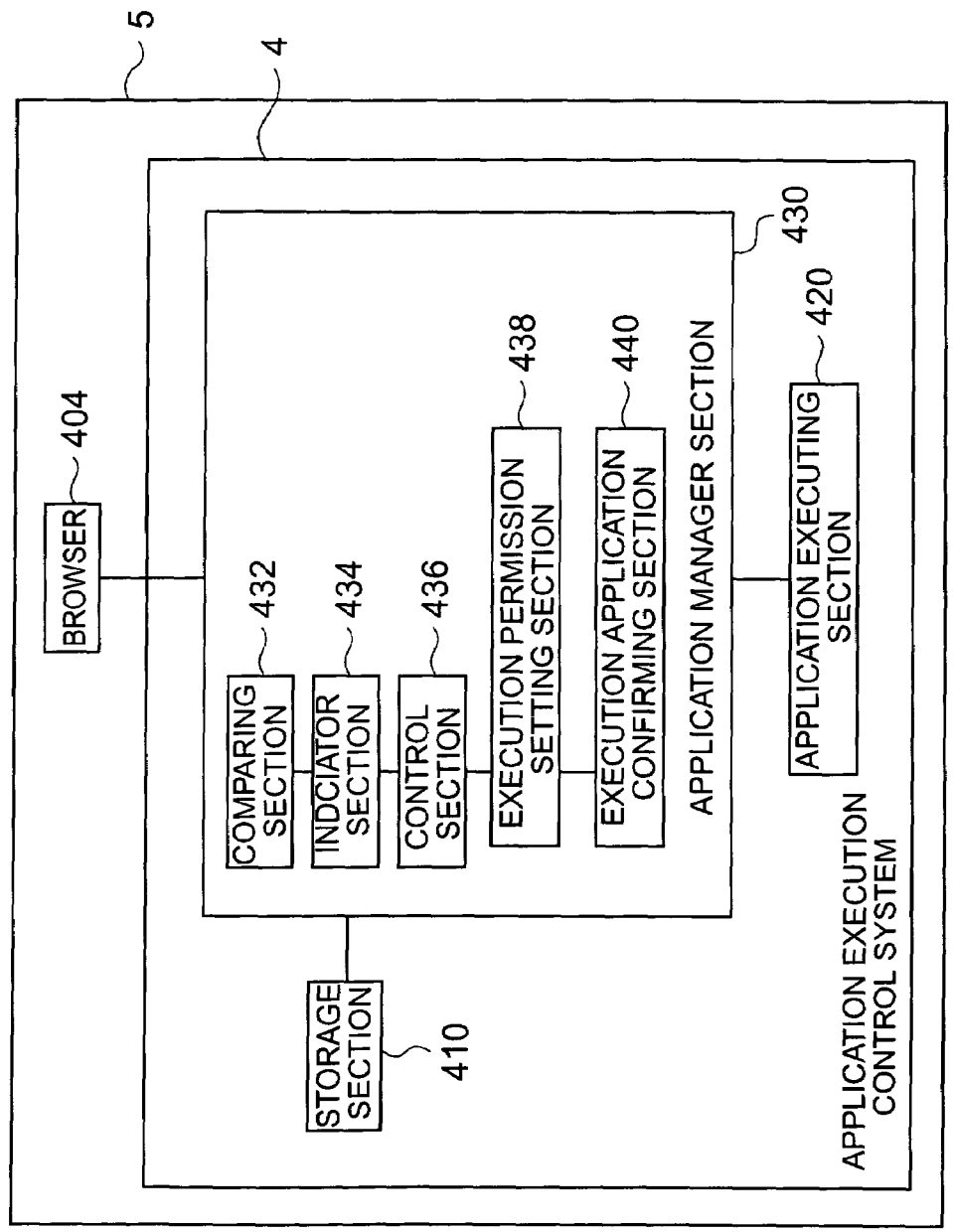
FIG. 7 is a diagram showing the functional composition of an application execution control system 4.

Firstly, the functional composition of an application execution control system 4 according to a second embodiment is described. FIG. 7 shows the functional composition of the application execution control system 4. As illustrated in FIG. 7, a mobile telephone 5 having a function for downloading and executing an application stored in a network server (hereinafter, called "application B" in the second embodiment) comprises an application execution control system 4. Moreover, the mobile telephone 5 comprises a browser 404. The application execution control system 4 controls the execution of application B, in the event that execution of application B is instructed by an HTML file located on the Internet and displayed by the browser 404 (hereinafter, called "HTML file B" in the second embodiment). The application execution control system 4 comprises a storage section 410 for storing downloaded applications B and corresponding attribute information files 44, an application executing section 420 for executing an application B stored in the storage section 410, and an application manager section 430 for managing the execution of the application B by the application execution section 420.

FIG. 8 shows the detailed definitions of the attribute information file 44. As shown in FIG. 8, the attribute information file 44 describes a plurality of groups comprising keys and their corresponding values, such as (AppName=Name of application B), (AppSize=Size of file storing application B), (PackageURL=URL of file storing application B), (AppClass=main class used to start up application B), (LastModified=date of last modification), and the like. In order that the application B is executed by an HTML file B located on the Internet and displayed by the browser 404, it is necessary for the key "LaunchByBrowser" to be defined in the attribute information file 44, and for a specific URL or "any" to be defined as the value thereof, in addition to the aforementioned (key=value) groups. A specific URL defined as the value indicates the URL of an HTML file which is able to execute the application B, whereas if the value is defined as "any", then this indicates that the application B can be executed by any HTML file.

The application manager section 430 comprises a comparing section 432 (comparing means), indicator section 434, control section 436 (control means), execution permission setting section 438, and execution application confirmation section 440.

The comparing section 432 refers to the attribute information file 44 and examines whether the LaunchByBrowser key is defined. If there is a LaunchByBrower key definition in the attribute information file 44, then the comparing section 432 compares the value thereof with the URL of the HTML file B, and judges whether or not the application B can be executed by the HTML file B.

If execution of application B is not possible, due to the judgement and settings of the comparing section 432, execution permission setting section 438 and the execution application confirmation section 440, then the indicator section 434 displays an indication to this effect on the display of the mobile telephone 5.

The control section 436 controls the execution of the application B in accordance with the judgement and settings of the comparing section 432, execution permission setting section 438 and the execution application confirmation section 440.

The execution permission setting section 438 receives permission or refusal from the user with regard to the execution of the application by the file being browsed.

The execution application confirmation section 440 confirms that the application instructed for execution by the HTML file B is stored in the storage section 410.

Next, the operation whereby the application execution control system 4 controls the execution of the application B will be described.

Figure 9:
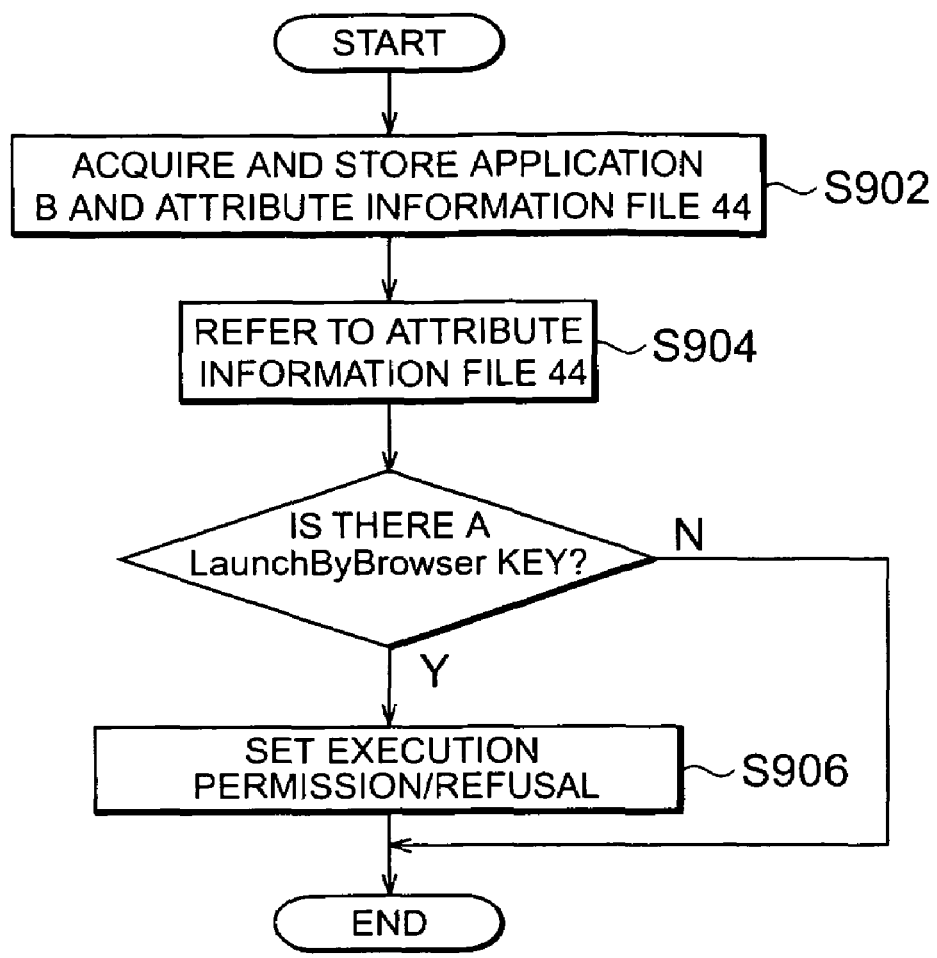
FIG. 9 is a flowchart showing the procedure of an operation wherein an execution permission setting section 438 receives permission or refusal settings.

FIG. 9 is a flowchart showing the procedure of an operation wherein the execution permission setting section 438 accepts a permission or refusal setting. When an application B and attribute information file 44 are acquired and stored in the storage section 410 (S902), the comparing section 432 refers to the attribute information file 44 and examines whether or not a LaunchByBrowser key is defined in the attribute information file 44 (S904).

If there is a LaunchByBrowser key definition in the attribute information file 44, then the execution permission setting section 438 receives a permission or refusal setting from the user with respect to the execution of the application by the file being browsed (S906).

Figure 10:
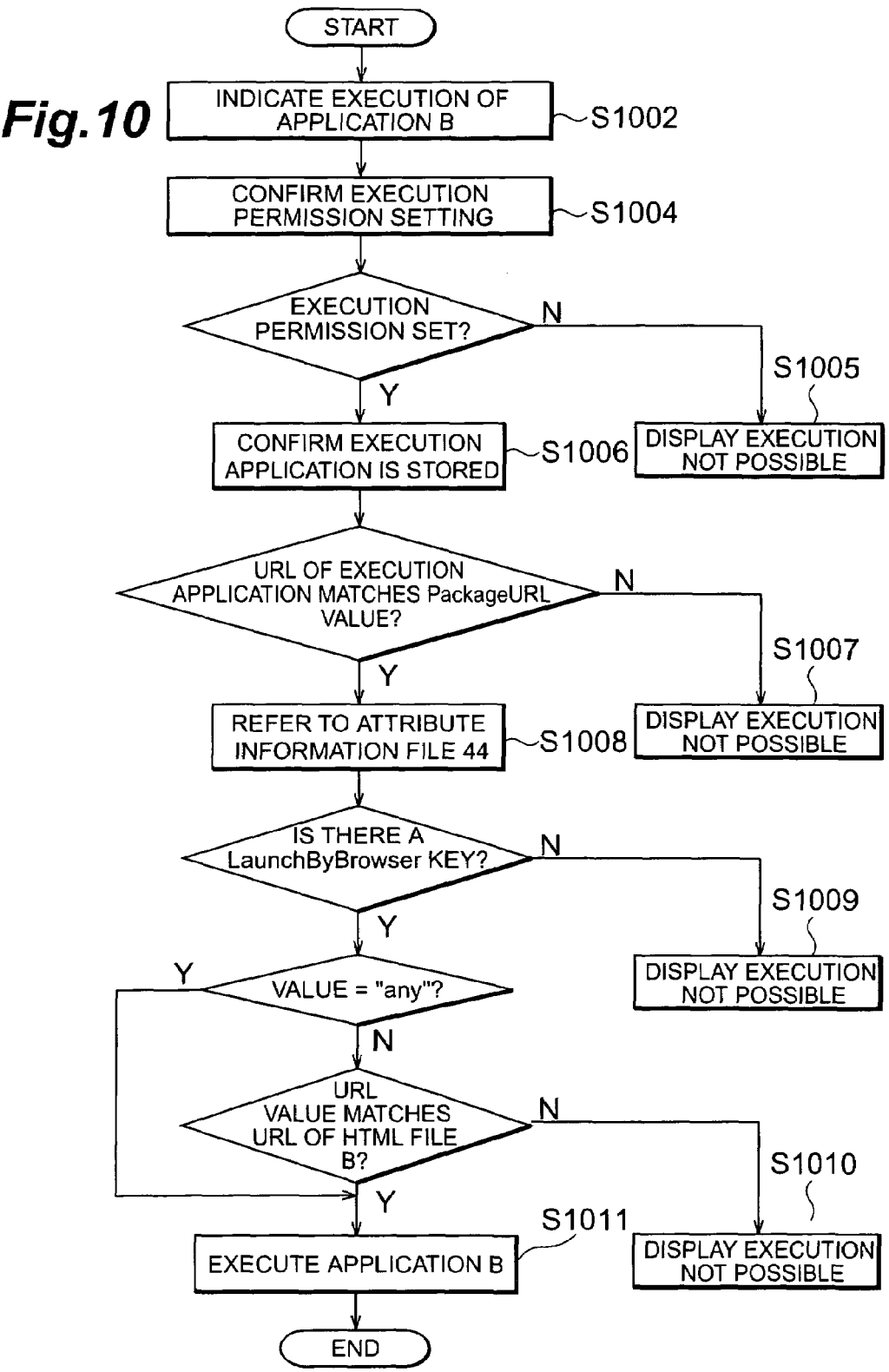
FIG. 10 is a flowchart showing the procedure of an operation wherein an application execution control system 4 controls the execution of the application B.

FIG. 10 is a flowchart showing the procedure of an operation wherein the application execution control system 4 controls execution of application B. When execution of an application B is instructed by an HTML file B (S1002), then the control section 438 confirms that the execution permission has been set (S1004). If execution permission has not been set, then the indicator section 434 displays an indication on the display of the mobile telephone 5 to the effect that application B cannot be executed (S1005).

If execution permission has been set, then the execution application confirmation section 440 confirms whether the application (execution application) instructed for execution by the HTML file B is stored in the storage section 410 (S1006). More specifically, it compares the URL of the execution application with the value of the PackageURL defined in the attribute information file 44 (URL of the file storing the application B). If the two URLs do not match, then the indicator section 434 shows a display on the display of the mobile telephone 5 indicating that the application B cannot be executed (S1007).

If the URL of the execution application matches the value of PackageURL defined in the attribute information file 44, then the comparing section 432 refers to the attribute information file 44 and examines whether there is a LaunchByBrowser key (S1008). If there is no LaunchByBrowser key, then the indicator section 434 indicates on the display of the mobile telephone 5 that the application B cannot be executed (S1009).

If there is a LaunchByBrowser key and the value thereof is "any", then the control section 436 allows the application executing section 420 to execute the application B (S1011) If there is a LaunchByBrowser key and the value thereof is a specific URL, then the comparing section 432 compares the specific URL with the URL of the HTML file B. More specifically, it examines the content length of the URL defined by the LaunchByBrowser value to see if the beginning part of the aforementioned specific URL and the URL of the HTML file B are matching. If they are not matching, then the indicator section 434 indicates on the display of the mobile telephone 5 that the application B cannot be executed (S1010).

If the specific URL and the URL of the HTML file B are matching, then the control section 436 allows the application execution section 420 to execute the application B (S1011).

In the action of the application execution control system 4 performing the operations described above, since the control section 436 controls the execution of the application B in accordance with the results of the judgement and comparison made by the comparing section 432, after the comparing section 432 has referred to the attribute information file 44 and compared the LaunchByBrowser value with the URL of the HTML file B, then the execution of an application in the mobile telephone 5 can be controlled easily. Moreover, by defining "any" or a specific URL as the LaunchByBrowser value, the provider of application B can indicate files on the Internet which are able to execute application B.

Third Embodiment

Figure 11:
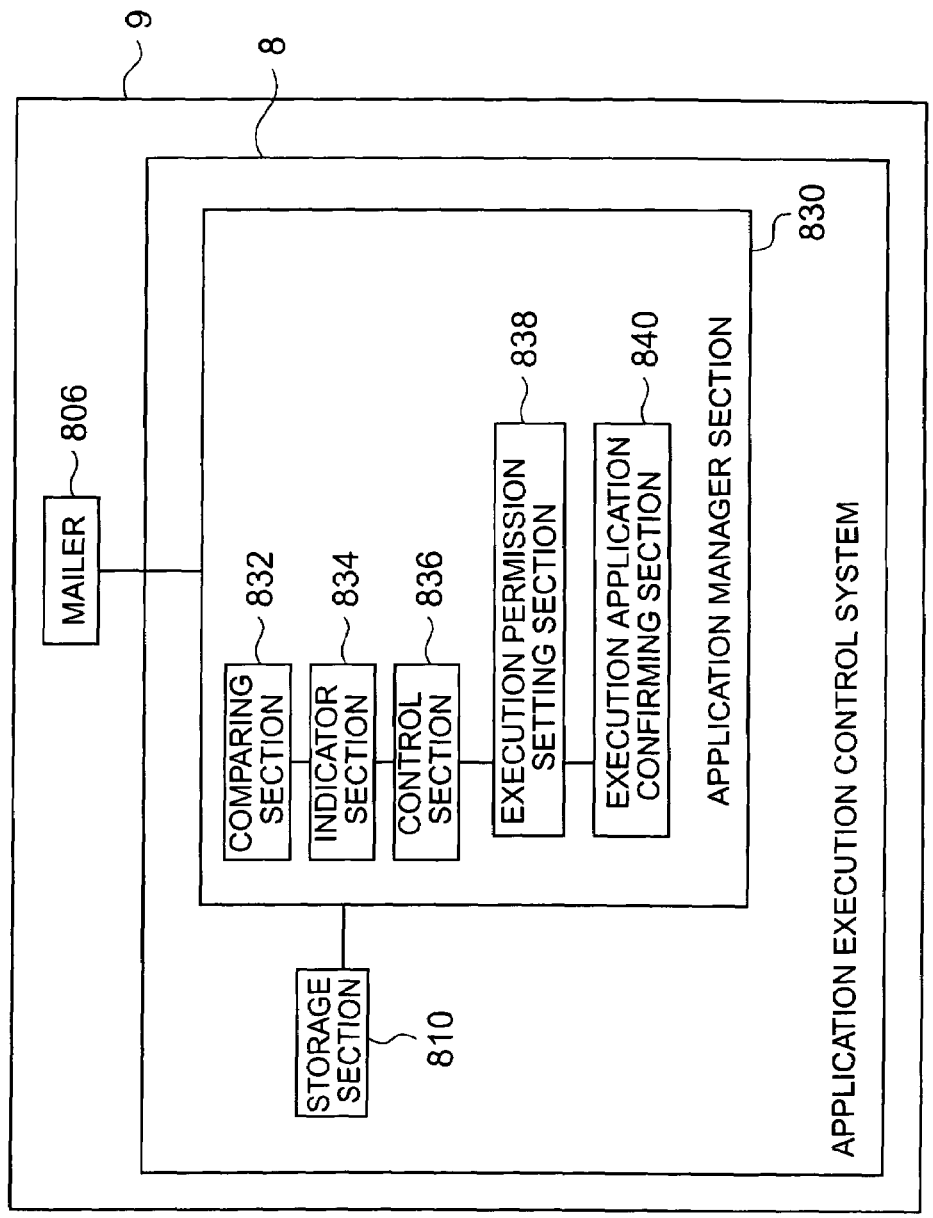
FIG. 11 is a diagram showing the functional composition of an application execution control system 8.

Firstly, the functional composition of the application execution control system 8 according to a third embodiment will be described. FIG. 11 shows the functional composition of the application execution control system 8. As illustrated in FIG. 11, a mobile telephone 9 having a function for downloading and executing an application stored in a network server (hereinafter, called "application C" in the third embodiment) comprises an application execution control system 8. Moreover, the mobile telephone 9 comprises a mailer 806. The application execution control system 8 controls the execution of the application C in cases where the execution of application C is instructed by an electronic mail received by the mailer 806 (hereinafter, called "electronic mail C" in the third embodiment). The application execution control system 8 comprises a storage section 810 storing downloaded applications C and corresponding attribute information files 84, an application executing section 820 for executing an application C stored in the storage section 810, and an application manager section 830 for managing the execution of an application C by the application execution section 820.

Figure 12:
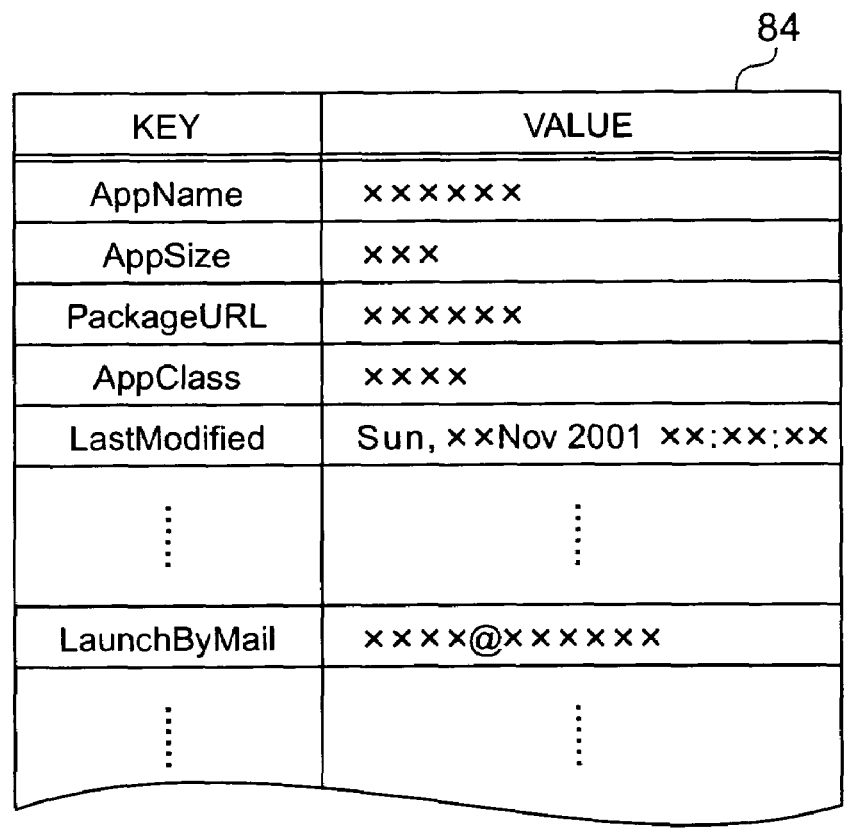
FIG. 12 is a diagram showing the contents of definitions in an attribute information file 84.

FIG. 12 shows the contents of an attribute information file 84. As shown in FIG. 12, the attribute information file 84 describes a plurality of groups comprising keys and their corresponding values, such as (AppName=Name of application C), (AppSize=Size of file storing application C), (PackageURL=URL of file storing application C), (AppClass=main class used to start up application C), (LastModified=date of last modification), and the like. In order that application C can be executed by an electronic mail C received by the mailer 806, in addition to the (key value) groups described above, the attribute information file 84 must contain a definition of a LaunchByMail key, and the value thereof must be defined as a specific mail address or as "any". If a specific mail address is defined as the value, then this indicates the mail address of electronic mail that is able to execute the application C, whereas if the value is defined as "any", then this indicates that the application C can be executed by any electronic mail.

The application manager section 830 comprises a comparing section 832 (comparing means), indicator section 834, control section 836 (control means), execution permission setting section 838 and execution application confirmation section 840.

The comparing section 832 refers to the attribute information file 84 and examines whether the LaunchByMail key is defined. If there is a LaunchByMail key definition in the attribute information file 84, then the comparing section 832 compares the value thereof with the sender mail address of the electronic mail C, and judges whether or not the application C can be executed by the electronic mail C.

If execution of application C is not possible, due to the judgement and settings of the comparing section 832, execution permission setting section 838 and the execution application confirmation section 840, then the indicator section 834 displays an indication to this effect on the display of the mobile telephone 9.

The control section 836 controls the execution of the application C in accordance with the judgement and settings of the comparing section 832, execution permission setting section 838 and the execution application confirmation section 840.

The execution permission setting section 838 receives a permission or refusal setting from the user with regard to the execution of the application by the electronic mail received by the mailer 806.

The execution application confirmation section 840 confirms that the application instructed for execution by the electronic mail C is stored in the storage section 810. Next, the operation whereby the application execution control system 8 controls the execution of the application C will be displayed.

Figure 13:
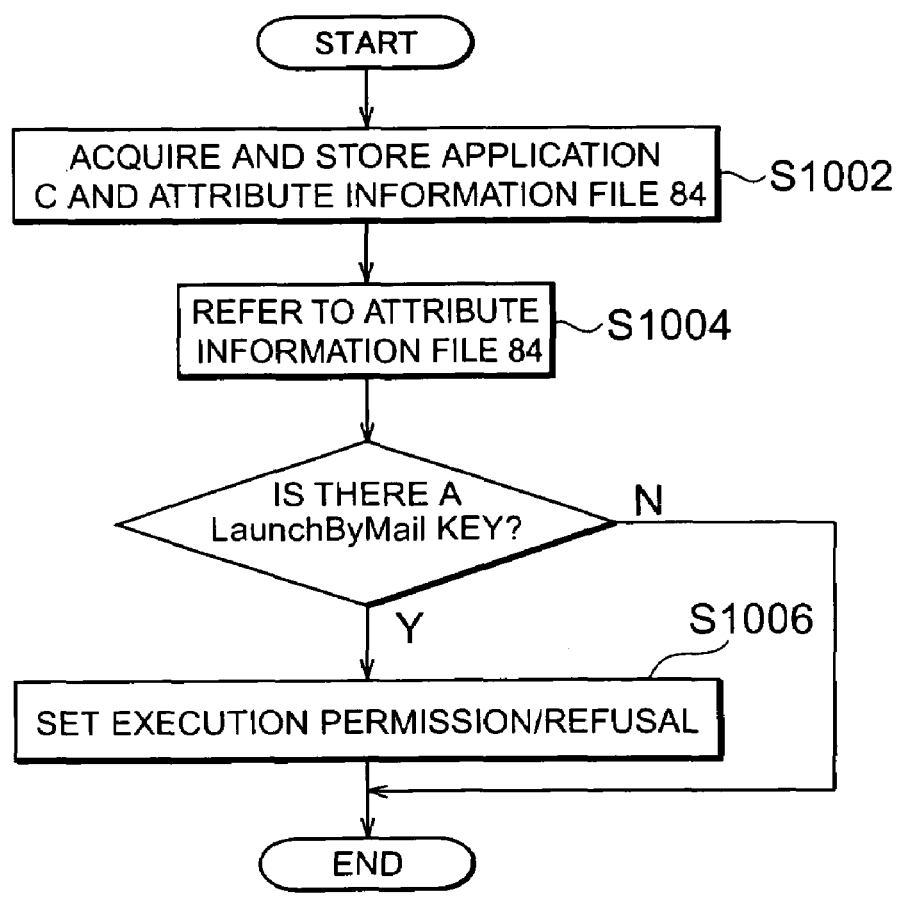
FIG. 13 is a flowchart showing the procedure of an operation wherein an execution permission setting section 838 receives permission or refusal settings.

FIG. 13 is a flowchart showing the procedure of an operation wherein the execution permission setting section 838 accepts a permission or refusal setting. When an application C and attribute information file 84 are acquired and stored in the storage section 810 (S1302), the comparing section 832 refers to the attribute information file 84 and examines whether or not a LaunchByMail key is defined in the attribute information file 84 (S1304).

If there is LaunchByBrowser key definition in the attribute information file 84, then the execution permission setting section 838 receives a permission or refusal setting from the user with respect to the execution of the application by the electronic mail received by the mailer 806 (S1306).

FIG. 14 is a flowchart showing the procedure of an operation wherein the application execution control system 8 controls execution of application C. When execution of an application C is instructed by an electronic mail C (S1402), then the control section 838 confirms that the execution permission has been set (S1404). If execution permission has not been set, then the indicator section 834 displays an indication on the display of the mobile telephone 9 to the effect that application C cannot be executed (S1405).

If execution permission has been set, then the execution application confirmation section 840 confirms whether the application (execution application) instructed for execution by the electronic mail C is stored in the storage section 810 (S1406). More specifically, it compares the URL of the execution application with the value of the PackageURL defined in the attribute information file 84 (URL of the file storing the application C) If the two URLs do not match, then the indicator section 834 shows a display on the display of the mobile telephone 9 indicating that the application C cannot be executed (S1407).

If the URL of the execution application matches the value of PackageURL defined in the attribute information file 84, then the comparing section 832 refers to the attribute information file 84 and examines whether there is a LaunchByMail key (S1408). If there is no LaunchByMail key, then the indicator section 834 indicates on the display of the mobile telephone 9 that the application C cannot be executed (S1409).

If there is a LaunchByMail key and the value thereof is "any", then the control section 836 allows the application executing section 820 to execute the application C (S1411). If there is a LaunchByMail key and the value thereof is a specific mail address, then the comparing section 832 compares the specific mail address with the sender mail address of the electronic mail C. More specifically, it examines the content length of the mail address defined by the LaunchByMail value to see if the end part of the aforementioned specific mail address and the sender mail address of the electronic mail C are matching. If they are not matching, then the indicator section 834 indicates on the display of the mobile telephone 9 that the application C cannot be executed (S1410).

If the specific mail address and the sender mail address of the electronic mail C are matching, then the control section 836 allows the application execution section 820 to execute the application C (S1411).

In the action of the application execution control system 8 performing the operations described above, since the control section 836 controls the execution of the application C in accordance with the results of the judgement and comparison made by the comparing section 832, after the comparing section 832 has referred to the attribute information file 84 and compared the LaunchByMail value with the sender mail address of the electronic mail C, then the execution of an application in the mobile telephone 9 can be controlled easily. Moreover, by defining "any" or a specific mail address as the LaunchByMail value, the provider of application C can indicate electronic mails which are able to execute application C.

INDUSTRIAL APPLICABILITY

According to the communications module execution control system and communications module execution control method, and the application execution control system and application execution control method of the present invention, the execution of applications in a communications terminal can be controlled easily. Moreover, a user can readily tell whether or not a communications module is to be executed by an application, and an application provider is able to set conditions for execution of the application, in the communications terminal.

The invention claimed is:

1. A communications module execution control system for controlling the execution of a communications module of a mobile phone by an application, comprising:

an interface, at the mobile phone, configured to download an application attribute information file corresponding to said application, said application attribute information file including information identifying whether said application is to execute said communication module of the mobile phone and information identifying whether said application is downloadable;

a first module configured to judge whether said application is downloadable by referring to said application attribute information file;

the interface at the mobile phone configured to download said application only if it determined by said first module that the application is downloadable;

a second module configured to control the execution of said communications module by said application, in accordance with the judgment result from said first module;

a measuring unit configured to measure a radio field state when said communications module is executed by said application; and a third module configured to halt the execution of said communications module by said application when the measured radio field state is at or below a prescribed level.

2. A communications module execution control method for controlling the execution of a communications module of a mobile phone by an application, comprising:

downloading, at the mobile phone, an application attribute information file corresponding to said application, said application attribute information file including information identifying whether said application is to execute said communication module and information identifying whether said application is downloadable;

judging whether said application is downloadable by referring to said application attribute information file;

downloading, at the mobile phone, said application only if it is determined based on a result of said judging that the application is downloadable;

controlling the execution of said communications module by said application, in accordance with the application attribute information;

measuring a radio field state when said communications module is executed by said application; and halting the execution of said communications module by said application, when the measured radio field state is at or below a prescribed level.

3. An application execution control system embodied in a communications terminal having a browser for controlling an execution of an application comprising:

a comparing unit configured to refer to an attribute information file in which a URL for said application is defined, and comparing a URL of the file on a network displayed by said browser with said URL defined by said attribute information file; and a controller configured to control the execution of said application in accordance with the comparison result from said comparing unit, wherein the execution of the application in the communications terminal is instructed by the file on the network being displayed by the browser.

4. An application execution control method for controlling the execution of an application in a communications terminal having a browser, comprising:

comparing an attribute information file in which a URL for said application, is defined, and a URL of the file on a network displayed by said browser with said URL defined by said attribute information file; and controlling the execution of said application in accordance with the comparison result from said comparing, wherein the execution of the application in a communication terminal is instructed by the file on the network being displayed by the browser.

5. The communications module execution control system of claim 1, wherein said attribute information file is downloaded prior to the judgment by the first module.

6. The communications module execution control system of claim 1, wherein said communications module is one of a telephone module, browser module, and e-mail module.

7. The system of claim 3, wherein the comparing unit compares the URL of the file on a network displayed by said browser with said URL defined by said attribute information file at the communications terminal.

8. The system of claim 4, wherein the comparing is performed at the communications terminal.

* * * * *